United States Patent
Serstad et al.

(10) Patent No.: US 12,205,186 B2
(45) Date of Patent: Jan. 21, 2025

(54) SECURITY CHECKPOINT APPARATUS AND METHOD

(71) Applicant: Tompkins Robotics, Inc., Raleigh, NC (US)

(72) Inventors: James M. Serstad, Orlando, FL (US); Michael C. Futch, Orlando, FL (US); Weston R. Goode, Jr., Acworth, GA (US); David Mitchell Dorsett, Acworth, GA (US)

(73) Assignee: TOMPKINS ROBOTICS, INC., Orlando, FL (US)

( * ) Notice: Subject to any disclaimer, the term of this patent is extended or adjusted under 35 U.S.C. 154(b) by 2 days.

(21) Appl. No.: 17/932,692

(22) Filed: Sep. 16, 2022

(65) Prior Publication Data
US 2023/0251667 A1    Aug. 10, 2023

Related U.S. Application Data

(63) Continuation of application No. PCT/US2022/076453, filed on Sep. 15, 2022.

(60) Provisional application No. 63/307,022, filed on Feb. 5, 2022.

(51) Int. Cl.
G06Q 50/26 (2024.01)
G01V 5/22 (2024.01)

(52) U.S. Cl.
CPC ............. *G06Q 50/265* (2013.01); *G01V 5/22* (2024.01)

(58) Field of Classification Search
CPC ... G05D 1/0225; G05D 1/0289; G01V 5/0016
See application file for complete search history.

(56) References Cited

U.S. PATENT DOCUMENTS

| | | | |
|---|---|---|---|
| 11,099,562 B1* | 8/2021 | Ebrahimi Afrouzi | G05D 1/0276 |
| 2002/0134836 A1* | 9/2002 | Cash | G06Q 10/08 235/385 |
| 2010/0158191 A1* | 6/2010 | Gray | G01N 23/04 378/57 |
| 2014/0003575 A1* | 1/2014 | Padgett | G01V 5/0008 378/57 |
| 2014/0070946 A1* | 3/2014 | Ambrefe, Jr. | H04W 4/029 340/541 |
| 2018/0203155 A1* | 7/2018 | Poulsen | G01V 5/224 |

(Continued)

FOREIGN PATENT DOCUMENTS

CN 107563246 A * 1/2018
WO WO-2016166686 A1 * 10/2016 ......... G06Q 10/0833

(Continued)

*Primary Examiner* — Donald J Wallace
(74) *Attorney, Agent, or Firm* — Parthiban A Mathavan

(57) ABSTRACT

Improved security checkpoint includes a security scanning system having multiple personal item intake locations, a security scanner, multiple personal item retrieval locations, and a plurality of computer-controlled vehicles for transporting personal items between the personal item intake locations, the security scanner, and the personal item retrieval locations. Personal items are placed into a tote by an individual, and the computer-controlled vehicles collect the totes containing the personal items, transport the tote to an available security scanner, deposit the tote at the security scanner, and then transport the tote either to a retrieval location or secondary screening location after the personal item has been screened.

20 Claims, 6 Drawing Sheets

(56) References Cited

U.S. PATENT DOCUMENTS

2021/0239627 A1\* 8/2021 Zhang .................... G01V 5/271
2021/0284358 A1\* 9/2021 Cottle .................... B65G 35/00

FOREIGN PATENT DOCUMENTS

WO     WO-2020112201 A1 \* 6/2020 ................ B60P 1/04
WO     WO-2020117874 A1 \* 6/2020 ........... B65G 1/0492

\* cited by examiner

SECURITY CHECKPOINT APPARATUS AND METHOD

CROSS-REFERENCE TO RELATED APPLICATIONS

This application is a continuation of International Patent Application No. PCT/US22/76453 filed on Sep. 15, 2022, which claims priority to U.S. Provisional Patent Application No. 63/307,022 filed on Feb. 5, 2022, the entire contents of which are incorporated by reference herein.

TECHNICAL FIELD

This invention relates generally to the field of security checkpoints and specifically to an improved security checkpoint apparatus and method that includes computer-controlled vehicles (e.g., robots) for transporting baggage or other personal items from an individual to a baggage scanner and back to the individual after the baggage has been cleared.

BACKGROUND

Security checkpoints are present at entry points to locations of significance such as airports, seaports, prisons, court houses, military bases, national monuments, and similar other locations. These security checkpoints often involve security screening of the person attempting to enter such a location along as well as a security screening of the baggage and other personal belongings carried by the person, with the security screening geared towards identification of potential items that might pose a security/safety threat. For example, at security checkpoints present at an airport entry point and controlled by a security organization such as, for e.g., the US Transportation Security Administration ("TSA"), the TSA officials typically require a prospective traveler to divest the carry-on baggage and other personal items carried by the traveler to be scanned by an x-ray or CT scanner. Any scanned item that is determined to be a potential threat may be redirected for a secondary screening. Currently the security screening process is done in a linear fashion with each traveler lane having its own assigned x-ray or CT scanner. An individual traveler typically picks a lane, waits in the queue until other travelers in front of the individual traveler have gone through their respective screenings and then the traveler is scanned by a personal (body) scanner or by an individual TSA official while the traveler's carry-on baggage and other personal belongings are scanned by the x-ray or CT scanner present in the traveler's chosen lane.

This approach suffers from inefficiencies. The utilization rates of the scanning machines and security personnel are relatively poor, and the lanes often become congested, increasing the effective travel time of travelers. Delays at security points may even result in an airlines operator choosing to delay flights to give travelers time to pass through security and board, impacting airline profits and slowing travel across the grid by, for example, connecting flights being delayed at one airport cascading to other delays at other airports.

Accordingly, opportunities exist for an improved security check process flow approach at airports and similar other locations.

SUMMARY OF INVENTION

Embodiments consistent with the present disclosure provide for systems and methods for checkpoint security. For example, in disclosed embodiments, a checkpoint security system may include: a system having one or more personal item intake locations, one or more security scanners, a transport area, one or more personal item retrieval locations, and a plurality of computer-controlled vehicles for transporting personal items through the transport area between the personal item intake locations, the security scanners, and the personal item retrieval locations; and a control system having a processor. The processor may be configured for: directing one of the plurality of computer-controlled vehicles to a personal item intake location to receive a personal item from an individual; associating the personal item received at the personal item intake location with the computer-controlled vehicle that received the personal item from the individual; directing the computer-controlled vehicle that received the personal item to a selected one of the security scanners for scanning of the personal item; and directing one of the plurality of computer-controlled vehicles to transport the personal item from the selected security scanner to a personal item retrieval location after the personal item has been scanned by the selected security scanner.

According to at least one embodiment, the computer-controlled vehicle that received the personal item from the individual performs one of: deposit the personal item at the selected security scanner or transport the personal item through the selected security scanner. According to at least one embodiment, the personal item intake locations comprise one or more of: an intake scanner, a screen, and a speaker. According to at least one embodiment, the screen and speaker provide instructions to the individual. According to at least one embodiment, the processor is further configured for associating the personal item with the selected security scanner. According to at least one embodiment, the personal item is placed in a tote, wherein the tote is received at the computer-controlled vehicle, wherein the processor is further configured for associating the personal item with the tote. According to at least one embodiment, the selected security scanner is selected based on availability across the one or more security scanners. According to at least one embodiment, the processor is further configured for associating the personal item with the personal item retrieval location. According to at least one embodiment, the personal item retrieval location requires the individual to be identified as being a correct person prior to permitting retrieval of the personal item by the individual. According to at least one embodiment, the processor is further configured for directing the computer-controlled vehicles along paths that avoid collisions with other computer-controlled vehicles, wherein the path determined for each computer-controlled vehicle is based on an estimated size of the personal item being transported by the computer-controlled vehicle. According to at least one embodiment, the transport area includes a platform divided into a plurality of nodes, each node comprising a navigation fiducial marker, wherein the processor is further configured for maintaining a list of nodes that each computer-controlled vehicle occupies at a moment in time. According to at least one embodiment, a number of nodes that each computer-controlled vehicle occupies is based on an estimated size of the personal item being transported by the computer-controlled vehicle. According to at least one embodiment, the transport area comprises multiple platforms arranged in a vertical configuration, with each platform including at least one of the security scanners. According to at least one embodiment, the plurality of computer-controlled vehicles is configured to travel across the multiple platforms arranged in the vertical configuration, wherein the computer-controlled vehicles move between the multiple platforms using a ramp or an elevator. According to at least one embodiment, each personal item intake location includes a tote for receiving personal items, wherein the tote optionally includes an identifying tag for tracking the personal item as it progresses through the checkpoint security system. According to at least one embodiment, each security scanner includes multiple output paths. According to at least one embodiment, at least one output path is for personal items that have been marked clear and at least one output path is for personal items that have been marked for secondary screening. According to at least one embodiment, the output path for personal items that have been marked clear is elevated above the output path for personal items that have been marked for secondary screening. According to at least one embodiment, the processor is further configured for directing a computer-controlled vehicle to transport one or more empty totes from the personal item retrieval location to the personal item intake location.

Disclosed herein is a method of screening personal items at a checkpoint security system. According to various embodiments, the method of screening personal items at a checkpoint security system includes: directing one of a plurality of computer-controlled vehicles to a personal item intake location to receive a personal item from an individual; associating the personal item received at the personal item intake location with the computer-controlled vehicle that received the personal item from the individual; directing the computer-controlled vehicle that received the personal item to a security scanner selected among a plurality of security scanners for scanning of the personal item; and directing one of the plurality of computer-controlled vehicles to transport the personal item from the selected security scanner to a personal item retrieval location after the personal item has been scanned by the selected security scanner.

DETAILED DESCRIPTION OF THE EMBODIMENTS

Figure 1:
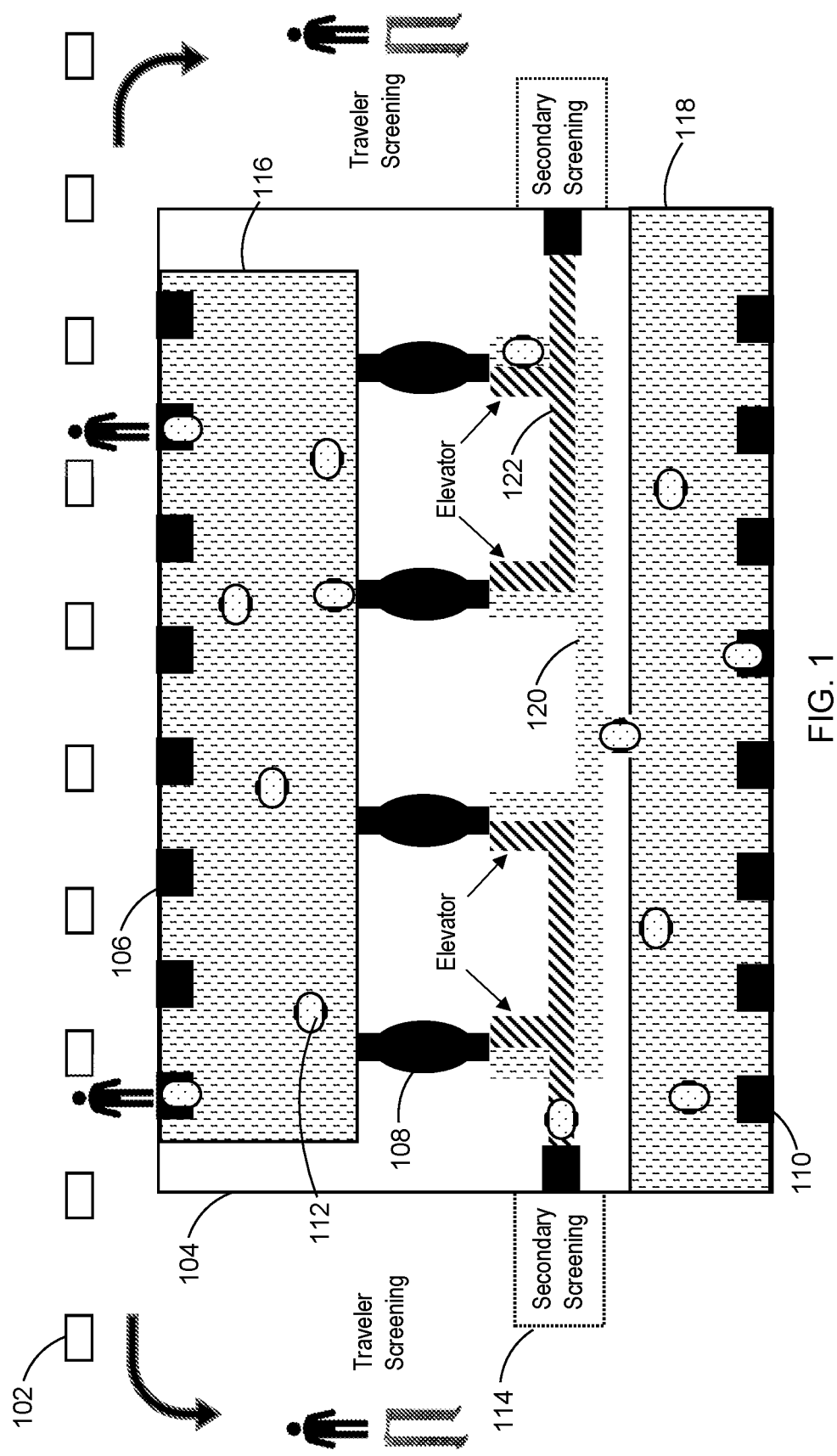
FIG. 1 depicts an example of one embodiment of an improved security checkpoint system, according to one or more embodiments of the presently disclosed subject matter.

Below, the technical solutions in the examples of the present invention are depicted clearly and comprehensively with reference to the figures according to the examples of the present invention. Obviously, the examples depicted here are merely some examples, but not all examples of the present invention. In general, the components in the examples of the present invention depicted and shown in the figures herein can be arranged and designed according to different configurations. Thus, detailed description of the examples of the present invention provided in the figures below are not intended to limit the scope of the present invention as claimed, but merely represent selected examples of the present invention. On the basis of the examples of the present invention, all of other examples that could be obtained by a person skilled in the art without using inventive efforts will fall within the scope of protection of the present invention. The present invention will be further described with reference to the accompanying drawings. Embodiments described herein provide for an improved security checkpoint system approach that addresses these inefficiencies. Specifically, described herein are an apparatus and method for an improved security checkpoint system that increases efficiency of personal screening and baggage screening through automation.

It will be understood that that the embodiments described below with reference to the figures are described, for ease of reference and understanding, in the context of screening a traveler's carry-on baggage and other personal items (e.g., laptop, jacket, shoes, belt, etc.) through an airport security checkpoint, but the concepts and principles apply equally to other venues where security is important as well. Accordingly, in the descriptions below, the individual is referred to as the traveler, the personal item is referred to as baggage, and the security scanner is referred to as a baggage scanner.

As noted earlier, a particular challenge at security checkpoints that leads to overall inefficiencies—particularly as it relates to airport checkpoints—is the current "linear" approach, whereby an individual (e.g., a traveler) proceeds to queue in a particular lane that has a carry-on items scanner (typically a CT or x-ray scanner) and a personal scanner for the individual. Since the scanning of the carry-on baggage and other personal items (e.g., coats, shoes, belts, and the like) along with the scanning of the individual are done linearly, delays in either the baggage scanning process or in the individual screening process can result in delays of the entire lane. For example, if either the individual or the individual's carry-on item is deemed to be a potential threat, the line may be slowed while the potential threat is resolved, with the scanned item or individual determined to be a potential threat being redirected for a secondary screening. Additionally, in the current "linear" approach, individuals are often left to choose their own lane for security screening, and the individuals may not have enough information available to them needed for selecting the optimal lane that would maximize overall efficiency of the security checkpoint.

To this end, described herein are an apparatus and method that involve receiving an individual's baggage (e.g., carry-on baggage or other personal items of a traveler) by a computer-controlled vehicle, transporting the received baggage with the computer-controlled vehicle to an available baggage scanner where the baggage can be scanned, and transporting the scanned baggage back to the individual by another computer-controlled vehicle after the individual has completed personal screening. In other words, baggage is separated from the individual, the individual is screened, and the carry-on baggage is scanned separately, i.e., in "parallel," and then the now-scanned baggage is reclaimed by the now-screened individual. This effectively separates the scanning of the individual and their baggage, allowing for significantly increased efficiency of a security checkpoint without compromising security.

According to at least one embodiment, an improved security checkpoint system (alternately referred to as "system") comprises one or more divestment locations (also referred to as baggage intake locations), where individuals (e.g., travelers) will divest their baggage (e.g., carry-on baggage and/or other personal items), one or more baggage scanners for scanning the baggage, one or more computer-controlled vehicles for transporting the baggage to and from the baggage scanners, one or more personal screening machines where individuals' persons, i.e., bodies, are screened, and pickup locations, where individuals may reclaim their baggage after both they and their baggage have been screened.

In various embodiments the improved security checkpoint system described herein, one or more screens or monitors may be disposed at the divestment locations (e.g., in or near baggage intake area 116 shown in FIG. 1) to instruct individuals to place their baggage, along with their coats and (if applicable) shoes, into the divestment location. Each divestment location may be provided with a corresponding screen placed near the divestment location such that a traveler at that divestment location may clearly see the screen. Alternatively (or additionally), a single screen may be placed above (or below) an array of such divestment locations that gives instructions to all individuals at each of the divestment locations in the array. As yet another alternative, screens may be placed between every two divestment locations or every-other divestment location, or above/below and between any divestment locations. Generally, one or more monitors/screens may be placed at any location nearby the divestment locations such that each individual at a divestment location will be able to see and read at least one screen.

In some embodiments, the improved security checkpoint system described herein may further include one or more speakers that are configured to provide information to users of the checkpoint, for example, information about how to use the divestment location (e.g., baggage intake area 116 shown in FIG. 1). Each of the one or more speakers may correspond to a single divestment location. In those embodiments where each screen or each speaker corresponds to a single location (e.g., baggage intake area 116 shown in FIG. 1), each screen and/or speaker may include or be connected to at least one controller forming part of the system, the controller having a central processing unit ("CPU") or processor for controlling the screen and/or speaker. The controller may be configured to change the instructions based on a changed or changing status of a known individual (e.g., traveler). The terms "controller" and "system" may be used interchangeably.

Each divestment location may include an intake scanner for tracking baggage as it is divested at the divestment location. The intake scanner may include, for example, an imager or scanner for reading an identifying tag, such as an RFID tag, a barcode, a QR code, or the like. The intake scanner may further include, for example, a vision system having a still camera or video camera having or connected to a controller for controlling the vision system. This may be the same controller that controls the screen and/or the speaker corresponding to the single divestment location. In one embodiment, the controller may be further configured to analyze an image or video captured by the vision system to determine whether a pair of shoes and/or coat/jacket and/or belt have been placed in the divestment location. If the controller determines that a required item is missing, the controller may be configured to control the screen and/or speaker to prompt the user to place the item(s) in the divestment location. In some embodiments, the intake scanner may further include a traveler information scanner, which is configured to read a traveler's ticket information or traveler's identification information (alternately referred to as traveler information), and a communicator, which communicates the traveler's ticket information or identification information to a system server. If a traveler needs to use the same divestment location twice, e.g., two loads, or to use more than one divestment location in order to have all of their carry-on baggage scanned, the traveler may scan his/her ticket (or other relevant identification) twice in order to ensure both groups of carry-on baggage are associated with that same traveler's identifying information. The intake scanner may further read biometric data from the traveler, for example using a fingerprint scanner or a retina scanner, to identify the traveler.

In at least one embodiment, the computer-controlled vehicles are robots (e.g., autonomous mobile robots or AMRs) such as computer-controlled vehicle 112 shown in FIG. 1) that may be utilized to transport carry-on baggage from a divestment location to a bagger scanner or to transfer scanned carry-on baggage from a baggage scanner to a carry-on baggage pickup location. In various embodiments, each robot may take any baggage from any divestment location to any baggage scanner and from any baggage scanner to any pickup location. For instance, once a traveler drops off his/her carry-on baggage and other carry-on items at a divestment location, an available robot, e.g., the nearest available robot, will then move the traveler's baggage to an available baggage scanner, for e.g., the nearest available baggage scanner. After the baggage scanner has completed scanning of the baggage, an available robot (which may or may not be the same robot that transported the baggage to the scanner) retrieves the scanned baggage and transports it to an available pickup location. Thus, if a security checkpoint is experiencing a high volume of travelers, this procedure advantageously provides for each of the baggage scanners to be utilized as efficiently as possible. In at least one embodiment, the personal item retrieval location is a location where the individual retrieves the personal item; alternately, the personal item retrieval location is a secondary screening location for further security screening.

In at least one embodiment, the computer-controlled vehicle that received the personal item from the individual deposits the personal item at the selected security scanner. In an alternate embodiment, the computer-controlled vehicle that received the personal item from the individual transports the personal item through the selected security scanner. In at least one embodiment, the computer-controlled vehicle that transports the personal item from the selected security scanner to the personal item retrieval location is the same computer-controlled vehicle as the computer-controlled vehicle that received the personal item from the individual.

Each of the robots may include a central processing unit ("CPU") or a processor configured to control the robot's movement and actions. The improved security checkpoint system may also include at least one centralized control system or controller (each having its own CPU or processor) for communicating with the robots and/or for controlling or directing the movement of each of the robots in particular, and the improved security checkpoint system in general. The centralized controller may also be in communication with the system server that receives the travelers' ticket information. Each robot may also be provided with a wireless communication system that is configured to communicate with the wireless communication systems of other robots as well as a wireless communication system of the centralized controller. These wireless communication systems may communicate with one another through any available wireless communication technology, for example, Wi-Fi communication (802.11 networks), radiofrequency (RF) communication (for example, in the 425 to 900 MHz frequency range), infrared (IR) communication, Bluetooth® communication, or cellular communication (3G, 4G, 5G, etc.).

Each of the robots preferably includes a propulsion or locomotion mechanism, for example, wheels or tracks and at least one motor for driving the wheels or tracks to move and steer the robot. In one embodiment, the movement of the robots occurs over a controlled "grid," where each robot may only move in two perpendicular directions. For instance, the robots may be configured only to move between nodes in a grid, the grid encompassing the area between the divestment locations and the pickup locations. However, other modes of movement of the robots, for e.g., optical navigation, radiofrequency-based navigation, visible light navigation, invisible light navigation, electromagnetic signal-based navigation, and similar other navigation technics are also within the scope of the presently disclosed subject matter. In one embodiment, the grid may be a square grid and may have its nodes spaced, for example, as a 1×1-foot grid, a 2×2-foot grid, a 3×3-foot grid, a 4×4-foot grid, a 5×5-foot grid, or a 6×6-foot grid. However, grids of other shapes are also within the scope of the presently disclosed subject matter. By configuring the robots in this manner, collisions may be avoided by each robot communicating with the central controller (or the controllers of the other robots) to ensure that it is moving to a grid node that will be unoccupied when it arrives. In some embodiments, the transport area may include a platform divided into a plurality of nodes, each node comprising a navigation fiducial marker, wherein the processor is further configured for maintaining a list of nodes that each computer-controlled vehicle occupies at a moment in time.

In at least one embodiment, constraint on the robots' movements along a plane in two perpendicular directions may be achieved via any of (i) the centralized controller, (ii) each robot's individual controller, or (iii) through mechanical constraints, such as by placing the robots on a grid-rail system or by configuring each robot's wheels such that the robot's movement is so constrained. In other embodiments, the robots may be configured to move in any direction along the ground or along a plane, and collisions may be prevented through any of the various traffic-control methods known in the art including, for e.g., optical navigation, radiofrequency-based navigation, visible light navigation, invisible light navigation, electromagnetic signal-based navigation.

In various embodiments, a personal item received at a computer-controlled vehicle is a piece of carry-on baggage. In at least one embodiment, the improved security checkpoint system is configured to handle oversized carry-on items. To this end, the improved security checkpoint system may include one or more large carry-on item divest locations that are larger than other regular divest locations, for receiving large carry-on items (oversized baggage) such as, for example, strollers, guitar cases, and other large items, that although larger than typical carry-on baggage, are allowed to be checked-in for various reasons. Correspondingly, one or more pickup locations for the large carry-on items may be larger than other pickup locations to receive the large carry-on items; further, at least some or all the robots may be configured to be capable of handling large carry-on items. Alternatively, or in addition, the improved security checkpoint system may also include one or more larger robots for transferring the large carry-on items from the divestment location to the baggage scanner, and one or more larger robots for transferring the scanned large carry-on items from the baggage scanner to one or more pickup locations. In a further alternative embodiment, the divestment locations, robots, and pickup locations are configured to be large enough to handle the largest carry-on items allowed under relevant regulations and/or policies of the relevant organizations for travel, e.g., policies of a particular airline or a particular airport. In some embodiments, all divest locations, all pickup locations, and all nodes in the square grid may be, for example, spaced apart from one another by at least 6 feet, to allow for large carry-on items to be carried by all the robots without the risk of collision.

In one embodiment, the baggage is divested into a tote or other container that includes an identifying tag, such as an RFID tag, a barcode, a QR code, or the like. To track the traveler's carry-on baggage, a ticket scanner at each divestment location reads the traveler's ticket information (or traveler information) and communicates, via its communicator, that traveler's ticket information to the system server. The centralized controller, receiving this traveler's ticket information from the system server, then associates the traveler's ticket information with a tote into which the baggage is placed, as determined by a scanner at the baggage divestment location.

The traveler's ticket information may accordingly be associated with the tote. In such an embodiment, the robot system may be configured such that it does not have access to or otherwise does not retain or store the traveler's ticket information, which protects privacy of the traveler. In one embodiment, the identifying tag on the tote is read by an imager or scanner at various stages along the path, for example, at the divestment location, when the tote enters the baggage scanner, when the tote exits the baggage scanner, and at the baggage retrieval location. In at least one embodiment, the baggage remains in the same tote throughout the entire process unless, of course, it is removed by security personnel during a secondary screening. In one embodiment, after the baggage is divested into a tote or other container (or directly onto a robot), the centralized controller determines which baggage scanner the baggage will be sent to; the centralized controller may then direct the robot to the selected baggage scanner. Once the robot arrives and loads the tote containing the baggage into the baggage scanner, the centralized controller may then associate the traveler's ticket information with that baggage scanner.

In one embodiment, after the traveler's baggage is scanned, the centralized controller, for e.g., operating on (or in the form of) control server 502, assigns a robot to receive the scanned baggage from the scanning machine; in one embodiment, the robot assigned to receive the scanned baggage from the scanning machine is the same robot that was assigned to load the scanned baggage into the scanning machine. The traveler's ticket information may optionally be associated with the assigned robot. If the baggage is determined to contain a potential security threat by the scanning machine, it (e.g., the baggage or the robot carrying the baggage at issue) is directed to a secondary scanning location. If the baggage is determined to not pose such a threat, the centralized controller assigns the baggage to a pickup location and directs the robot to transport the baggage to that assigned pickup location. The centralized controller then associates the traveler's ticket information with that selected pickup location, and the traveler may recover his/her baggage at that selected/assigned pickup location. In one embodiment, each pickup location may have a locking door that opens only after the traveler scans the ticket that has been associated with that pickup location.

In an alternative embodiment, the baggage scanners may be configured such that the robot can drive directly through the scanner; in such an embodiment, the robot drives the baggage through the baggage scanner—rather than load the tote containing the baggage into the baggage scanner and then having another robot pick the baggage up at the output of the baggage scanner.

In an alternative embodiment, instead of using a traveler's ticket information, a traveler's government issued identification, e.g., driver's license or passport ("traveler's identification information"), may be scanned by the traveler's ticket information scanner at the divestment location, and each step of the process may then proceed analogously with the traveler's identification information, rather than the traveler's ticket information, being used to associate each relevant robot, scanner, and location.

In an alternative embodiment, each divestment location may include a printed baggage-ticket dispenser, the dispenser operating to give the traveler a baggage ticket when the traveler divests the baggage. A unique identifier for this ticket, rather than a traveler's ticket information or identification information, is then associated with each relevant robot, scanner, and location. The baggage ticket may then be scanned at the pickup location to retrieve the traveler's baggage.

In some embodiments, the improved security checkpoint system includes an enclosure that encloses the baggage scanners. Baggage or other personal items may enter the enclosure (for e.g., see enclosure 104 shown in FIG. 1 and FIG. 5) at the divestment locations and exit the enclosure at the pickup locations. The enclosure may also have secondary screening locations where baggage or other items that are deemed to be a potential security threat may be dropped off by a robot for further scanning. In one embodiment, the enclosure may be made of a transparent material, e.g., glass or transparent plastic that allows travelers to see into the enclosure. In one embodiment, at least a portion of the enclosure is made up of or comprises translucent or opaque material.

In one embodiment, the improved security checkpoint system includes one or more personal screening locations having personal scanners for scanning traveler's persons (bodies). The personal screening locations may be located to one or either side of the enclosure. Alternatively, the personal screening locations may be located above or below the enclosure. For instance, each divestment location may include an elevator which lowers or raises the divested baggage to a different level.

After divesting their baggage, travelers may walk around, above, or below the enclosure to the personal screening locations. In any event, the location of the personal screening locations is set up such that, after the traveler divests the baggage at a divestment location, the traveler must pass through one of the personal screening locations before being able to reclaim their baggage at the associated pickup location, thus ensuring the checkpoint is secure.

If, while passing through a personal screening location, a traveler is found to still have in the traveler's possession an object which is typically scanned by a baggage scanner, this scenario may provide security personnel at the personal screening location with a few options. If the object is not necessarily required to be scanned or searched, e.g., a wallet or belt, the object may simply be removed from the traveler while the traveler goes through the personal screening location. If the object must be searched or scanned, and a search would not result in too long of a delay, the object may be hand searched by the security personnel at the personal screening location; on the other hand, if the object is one that must (by standing orders or regulations) be scanned or would otherwise require too lengthy of a hand search, a robot may be summoned to the personal screening location to transport the baggage to a baggage screener that may be a specialized baggage screener; alternately, the traveler may be directed, for e.g., by the centralized controller or by the security personnel, to return to a divestment location and place the object at issue at the divestment location to be picked up by a robot and scanned.

In some embodiments, the enclosure may comprise of more than one vertical level connected by at least one elevator between levels for use by the robots. In one embodiment, a ramp may be provided between levels for use by the robots. Having multiple levels advantageously provides more room for the robots to move around the enclosure. In some embodiments, baggage scanning machines may be located on only one of the multiple levels, and the other level(s) is used for, e.g., by unladen robots to move between pickup locations, baggage scanning machines, and divestment locations for their next transportation task. For example, a ramp (such ramp 33 shown in FIG. 5) may be provided for the sliding down of empty totes and/or of robots (such as computer-controlled vehicle 112 shown in FIG. 5). This approach can advantageously lessen traffic from robots returning from completed tasks. In this embodiment, the level(s) without the baggage scanning machines may have a shorter vertical height than the level with the baggage scanning machines in order to conserve space. Alternatively, baggage scanning machines may be located on more than one level. This alternative arrangement allows for more baggage scanning machines to be accessible for scanning in a smaller footprint, increasing the area available for, for example, personal screening stations.

The improved security checkpoint system described here allows for isolation and automation of the carry-on baggage checking portion of, for example, airport security. This can allow for personal (body) scanning of travelers to be performed in parallel (at the same time) as carry-on baggage scanning, improving efficiency, for example, due to reasons such as: reducing traveler wait times, decreasing the number of security personnel need, and providing for a smaller physical footprint of the security checkpoint system.

FIG. 1 depicts an embodiment of the improved security checkpoint system. Referring to FIG. 1, in one embodiment, the improved checkpoint security system (alternately referred to herein as "system") includes traveler document checkpoints 102 (where travelers' identification and flight information are checked), traveler screening locations, and an enclosure 104 housing carry-on baggage scanning machines 108 (also referred to herein as security scanners). The system further comprises divestment locations 106 (also referred to herein as baggage intake locations) located at baggage intake area 116, where travelers place their carry-on baggage to be scanned. The system also comprises computer-controlled vehicles 112, e.g., robots (also referred to herein as transport devices), for transporting the baggage to and from the baggage scanning machines 108; pickup locations 110 (also referred to as baggage retrieval locations) located at baggage retrieval area 118, where travelers recover carry-on item (e.g., carry-on baggage) that was scanned successfully; and, secondary screening locations 114, where any carry-on items that the baggage scanning machines deem to be a potential threat are dropped off for further screening by security personnel.

In one embodiment, each divestment location 106 includes a display screen and a speaker (not shown) for providing instructions to each traveler. Each divestment location may also include a travel information scanner for scanning a traveler's ticket. The travel information scanner, screen, and speaker include or are connected to a divestment location controller (having a CPU or processor) that controls the travel information scanner, screen, and speaker. In one embodiment, each divestment location 106 further includes a microphone and other associated equipment to facilitate two-way communication between the traveler and the divestment location controller or a security personnel. Based on a status of the traveler determined by the information on the traveler's ticket, the screen and speaker may give specific (e.g., customized) instructions to a specific traveler or a specific category of travelers; for example, the instructions announced from the speaker to travelers over 70 years old may instruct them not to remove their shoes. The divestment location controller is also connected to a communicator that can communicates with a system server that is in turn connected to a centralized controller configured to control operation of the improved security checkpoint system. In one embodiment, the divestment location controller is in communication with the centralized controller operating on, in the form of, or forming part of, control server 502 shown in FIG. 3. The divestment location controller is configured to send a traveler's ticket information, determined from scanning the passenger's ticket with the travel information scanner, to the centralized controller or control server.

The traveler may divest carry-on item(s) such as a baggage at the divestment location 106 by placing the baggage into a tote (or other container) that is waiting at the divestment location 106. The tote is shown and described in more detail in the context of FIG. 2. After divesting the baggage, the traveler then proceeds to a separate traveler screening area, where their person is screened for threats.

Figure 2:
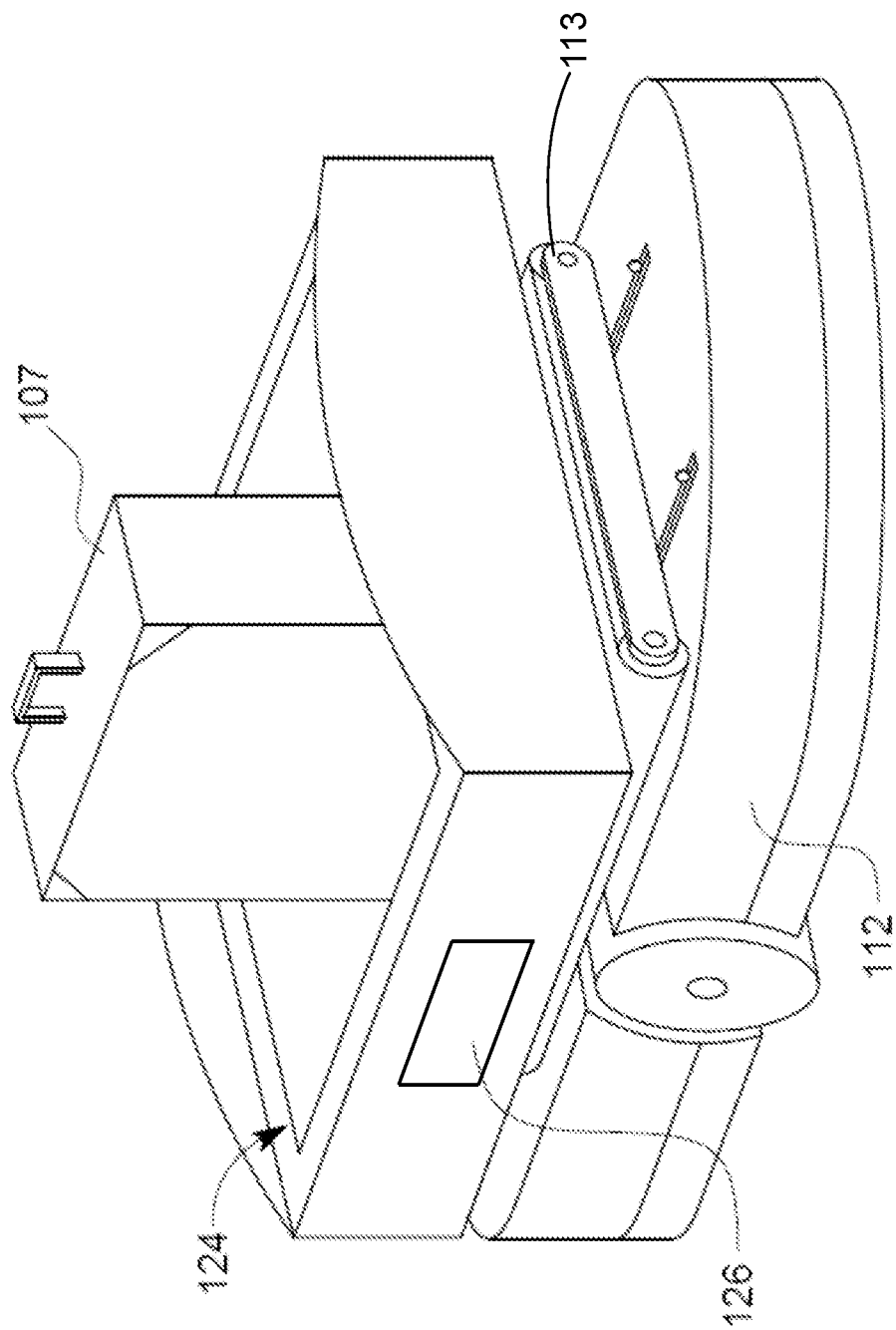
FIG. 2 depicts an example of a computer-controlled vehicle with a tote used for transporting baggage about the improved security checkpoint system, according to one or more embodiments of the presently disclosed subject matter.

The centralized controller then directs a computer-controlled vehicle 112 to collect the tote containing the divested baggage. The computer-controlled vehicle 112 may be an autonomous mobile robot (AMR). In some embodiments, the computer-controlled vehicle 112 may include a crossbelt for engaging and collecting the tote containing the divested baggage (as shown in FIG. 2). The identifying tag on the tote may be scanned at the divestment location 106 to associate the computer-controlled vehicle and the owner of the baggage with the particular tote being collected. In some embodiments, the centralized controller may additionally or alternatively associate the traveler's ticket information with that computer-controlled vehicle or that tote. The centralized controller also determines an available baggage scanner such as baggage scanning machine 108 among several baggage scanners and directs the computer-controlled vehicle 112 to transport the carry-on item to the assigned baggage scanner. The centralized controller, for e.g., operating on control server 502 or in the form of control server 502, may associate the tote, the computer-controlled vehicle and/or the traveler's ticket information with the assigned baggage scanner.

In at least one embodiment, the baggage scanner may be selected by the system using a load-balancing algorithm to ensure that each baggage scanner is operating at an optimum efficiency. Additionally, in at least one embodiment, the selected baggage scanner may be updated in real-time to divert incoming baggage away from a particular baggage scanner in which there is a problem or is backed up for some reason. Accordingly, in at least one embodiment, centralized controller routes the computer-controlled vehicle to a specific baggage scanner among several baggage scanners based on the load-balancing algorithm that operates to reduce, minimize, or eliminate backlogs among several baggage scanners.

After the baggage has been scanned, the centralized controller assigns a (optionally a different) computer-controlled vehicle 112 to retrieve the scanned baggage from the output of the baggage scanner and, upon retrieval, the centralized controller may associate the tote and/or the traveler's ticket information with the computer-controlled vehicle 112 that retrieved the scanned baggage. If the baggage scanner marks the baggage as clear (i.e., does not identify a potential threat), the centralized controller then directs the computer-controlled vehicle to deposit the scanned baggage at an assigned pickup location 110 and associates the passenger's ticket information with that pickup location. Alternatively, if the scanned baggage is determined to contain a threat or a potential threat, the centralized controller operates to instruct or direct the computer-controlled vehicle to deposit the baggage at an assigned secondary screening location 114 for further screening by security personnel or by a specialized scanner. The tote and/or the traveler's ticket information may be associated with that secondary screening location.

In one embodiment, when a traveler attempts to divest the traveler's several bags at the divestment location 106, the controller (or the system) may inform the traveler through, for e.g., a prompt on the screen, that one of the divested bags (or the sole divested bag) is being rejected. This rejection may be due to a variety of reasons including, for example, the traveler being identified by the controller to be on the "no-fly" list, the rejected bag being of a shape, size or weight that falls outside of an acceptable range, the rejected bag or the owner of the bag being red-flagged by an authority or an authorized person, and similar other reasons. The controller may further advise the traveler to contact appropriate authority personnel to determine the next steps.

In one embodiment, the controller (or the system) is configured to track several bags forming part of the baggage divested by a single (i.e., by the same) traveler from the divestment location 106 to the pickup location 110. In this embodiment, the controller may group the computer-controlled vehicles carrying all bags divested by the same traveler together or all totes carrying all bags divested by the same traveler together, as these bags undergo scanning through the baggage scanner, and as the scanned bags are transported and delivered to the pickup location. This advantageously adds a further level of efficiency to the process wherein the traveler does not need expend effort in locating all the bags belonging to the traveler.

In one embodiment, the controller further operates to sequence all the bags divested by the same traveler as the bags move from the divestment location 106 to the pickup location 110 wherein the sequencing is based on a sequencing engine or a sequencing algorithm. For example, in some embodiments, the controller may sequence the scanning of all bags of the same (first) traveler together and prior to the controller sequencing one or more bags belonging to a second traveler; in a further example, the controller may sequence the scanning of large bags of the same traveler before the scanning of small bags of the same traveler. In one embodiment, the group of computer-controlled vehicles carrying all bags divested by the same traveler are sequenced and otherwise controlled by the controller such that when a first portion of the computer-controlled vehicles carrying bags that have already been scanned, and a second portion of the computer-controlled vehicles carrying the remainder of bags are yet to be scanned, the first portion of the computer-controlled vehicles may park and wait for the second portion of computer-controlled vehicles carrying the remainder of bags (or wait for the remainder of the bags themselves) to complete the scanning step, and once all of the bags in the group have completed the screening step (or all of the computer-controlled vehicles in the group have been accounted for post screening), the controller may then direct all of the parked computer-controlled vehicles in the group to proceed to the pickup location so that the traveler can collect all bags belonging to the traveler at the same time, thereby avoiding unnecessary delays and inconveniences.

In an embodiment where the controller (or the system) is configured to track all bags divested by the same/single traveler from the divestment location 106 to the pickup location 110, in the case where one of the bags is flagged as potentially posing a security threat following scanning at the baggage scanner and is directed (for e.g., by the controller or by an authorized individual) to proceed to a secondary scanning location, the controller may direct those computer-controlled vehicles carrying the remaining bags divested by the same traveler that have already been cleared as being safe to park and wait for the computer-controlled vehicle carrying the flagged bag to complete its secondary scanning step, and once the secondary screening of the flagged bag is completed and the flagged bag is cleared, the controller may then direct all of the parked computer-controlled vehicles plus the computer-controlled vehicle carrying the now-cleared bag to proceed to the pickup location so that the traveler can collect all bags belonging to the traveler at the same time, thereby avoiding unnecessary delays and inconveniences. In at least one embodiment, each piece of baggage remains in the same tote throughout the entire process unless it is removed by security personnel during the secondary screening.

In one embodiment, when any one bag of among a plurality of bags dropped by the same traveler goes to secondary screening, all other bags belonging to that same traveler that do not undergo secondary screening are delivered to a location juxtaposed to the location of secondary screening so once the traveler's bag is cleared at the location of secondary screening, all of the traveler's bags are available in the same area to thereby facilitate easy collection by the traveler. In some embodiments, the computer-controlled vehicle 112 carrying the bag to the location of secondary screening may drop off the bag and return to the divestment location 106 (without waiting at the secondary screening location) for its next assignment; in some embodiments, the computer-controlled vehicles 112 carrying all the other bags belonging to that same traveler that do not undergo secondary screening too may drop off the bags and return to the divestment location 106 (without waiting at the secondary screening location) for its next assignment (e.g., for receiving its next baggage for transportation). The computer-controlled vehicles 112 returning to the divestment location 106 without waiting at the screening location may advantageously operate to improve efficiency of the system. In various embodiments, any computer-controlled vehicle 112 transporting a scanned luggage to an assigned pickup location 110 may deposit the scanned luggage at the assigned pickup location 110 immediately on arrival and return to the divestment location 106 for its next assignment.

In various embodiments, one or more screens or monitors are disposed at the pickup locations for providing instructions to travelers regarding recovery or pickup of all pieces of their baggage, along with their coats and shoes, at the pickup location. In one embodiment, similar to the divestment location 106, each pickup location 110 too is provided with a corresponding screen placed near the pickup location such that a traveler at that pickup location may clearly see the screen. Alternatively (or additionally), a single screen may be placed above (or below) an array of such pickup locations that gives instructions to all individuals at each of the pickup locations in the array. As yet another alternative, screens may be placed between every two pickup locations or every-other pickup location, or above/below and between any pickup locations. Generally, one or more monitors/screens may be placed at any location nearby the pickup locations such that each individual at a pickup location will be able to see and read at least one screen. The pickup location may further include one or more speakers that are configured to provide information, for example, about how to use the pickup location. In one embodiment, each of the one or more speakers may correspond to a single pickup location. In those embodiments where each screen or each speaker corresponds to a single pickup location, each screen and/or speaker may be connected to the controller, with the controller configured to provide instructions, as well as provide updated or modified instructions based on a changed or a changing status of a known individual (e.g., traveler).

In one embodiment, if the controller determines that a piece of baggage associated with a traveler is yet to arrive, the controller may control the screen and/or speaker to update the user about the whereabouts of that yet to arrive piece of baggage. In some embodiments, the controller may further display or otherwise communicate the traveler's ticket information or identification information to the traveler, with the centralized controller associating the traveler's ticket information with a selected pickup location as well as with the piece of baggage that is yet to arrive, and the traveler may recover his/her baggage at that selected/assigned pickup location when it ultimately arrives. In one embodiment, the controller is configured to capture input from the traveler at a graphical user interface. For example, the traveler may be requested to provide verbal feedback or input typed in feedback regarding their experience through the security checkpoint system; as another example, the traveler may be able to provide input regarding a shoe or a piece of clothing belonging to the traveler that is yet to arrive and the controller is configured to capture such input from the traveler at the graphical user interface; the controller may be further configured to control, direct and manage follow-up actions based on the recognition and interpretation of the captured input.

In at least one embodiment, in a scenario where a baggage dropped off at the divestment location 106 by a traveler is identified as containing contraband gets flagged for secondary screening and the baggage is then intentionally abandoned by the traveler that originally dropped off the baggage, the controller may be configured to store and later output proof, for e.g., on demand, that identifies the specifics of the traveler that dropped off that baggage at the divestment location. In one embodiment, where a bag of a traveler is unintentionally abandoned, e.g., due the traveler not verifying receipt of all of the traveler's belongings before leaving the pickup location, the centralized controller may identify that the bag has not been collected by the associated traveler at the pickup location; the centralized controller may further capture and communicate information regarding the abandoned bag as well as of the associated traveler; the centralized controller may further direct, control or manage various actions needed for the proper handling of the bag. In one embodiment, where a bag of a traveler is abandoned due to the traveler never passing through the security checkpoint system, the centralized controller may identify that the bag has not been collected by the associated traveler at the pickup location; the centralized controller may further capture and communicate information regarding the abandoned bag as well as of the associated traveler where possible; and the centralized controller may further direct, control and manage appropriate actions needed for the proper handling of the bag.

In one embodiment, the baggage scanners are provided with two different output paths—one for baggage marked clear and one for baggage marked for further screening. For example, as shown in FIG. 1, the output for baggage marked for further screening may be connected to a secondary screening platform 122 for transporting the baggage to the secondary screening location. In some embodiments, the secondary screening platform 122 may be elevated or recessed relative to the platform 120 used for baggage marked clear. In some embodiments, elevators may be used to move the baggage marked for secondary screening to the separate platform. In some embodiments, ramps may be used to facilitate movement of the baggage marked for secondary screening to the separate platform. In some embodiments, only a single output path may be used for both types of baggage—baggage marked clear and baggage marked for further screening.

If no threat is found in a scanned baggage, the passenger may, after having successfully progressed through a traveler screening location (located on one side, or either side, of the enclosure in FIG. 1), recover the scanned baggage at the assigned pickup location. In one embodiment, the pickup location includes a locking door or gate (not shown) and a ticket scanner that, when the associated traveler's ticket is scanned thereon, facilitates the unlocking of the door or gate, and allows the passenger to recover their carry-on baggage.

In various embodiments, the system is further configured to direct the computer-controlled vehicles to transport empty totes from the baggage pickup location (i.e., after the traveler has retrieved their baggage or other personal items from the baggage pickup location) back to the baggage intake location to ensure that there are always empty totes available at the baggage intake location ready for subsequent travelers to use to deposit their baggage or other personal items. In one embodiment, each baggage retrieval location may include a slide or ramp (such as, for e.g., ramp 33 shown in FIG. 5) provided for an empty tote to slide down to a tote collection area; alternately, the security checkpoint system may be further configured such that the empty tote can slide directly onto a computer-controlled vehicle; in one embodiment, the computer-controlled vehicle 112 carrying the empty tote is the same vehicle that delivered that tote with baggage thereon to the baggage pickup location.

In an embodiment, enclosure 104 may include two or more levels separated from one another vertically; in one embodiment, the baggage scanners may be disposed on a topmost level (e.g., topmost level 204 shown in FIG. 6), and the bottommost level (e.g., bottommost level 206 shown in FIG. 6) may be used for unladen computer-controlled vehicles to travel to either an assigned divestment location or an assigned baggage scanner in order to pick up baggage for transport, thus increasing the efficiency of the computer-controlled vehicles by reducing the traffic. In some embodiments, additional levels may be provided between the topmost level and the bottommost level depending on the implementation of the invention. If all the baggage scanners are disposed on the topmost level, each of the other levels may have a shorter vertical height, span, or clearance than the topmost level in order to conserve space. The security checkpoint system may further comprise elevators (not shown) for use by the computer-controlled vehicles to move between various levels of the enclosure. There may further be a computer-controlled vehicle parking zone provided where the vehicles may sit either while not in use during less busy periods or while waiting for their place in the queue during more busy periods. The security checkpoint system may further include charging locations provided where the computer-controlled vehicle can recharge.

FIG. 2 depicts an example of a robot with a tote used for transporting baggage in the improved security checkpoint system. Referring to FIG. 2, computer-controlled vehicle 112 (e.g., in the form of a robot) transports tote 124, which includes an identifying tag 126 that can be read by a scanner, such as an RFID tag, a barcode, or a QR code. Tote 124 may be appropriately sized at its inner dimensions to hold baggage that is the maximum allowable size of a carry-on bag (e.g., baggage such as personal item 107). Tote 124 may further be appropriately sized at its outer dimensions to fit through the baggage scanners. Tote 124 may further include features that assist the computer-controlled vehicles 112 in engaging the tote—such las an outer lip, a textured bottom to engage a crossbelt (such as crossbelt 113 shown in FIG. 2), one or more magnets, hooking areas, or the like.

Figure 3:
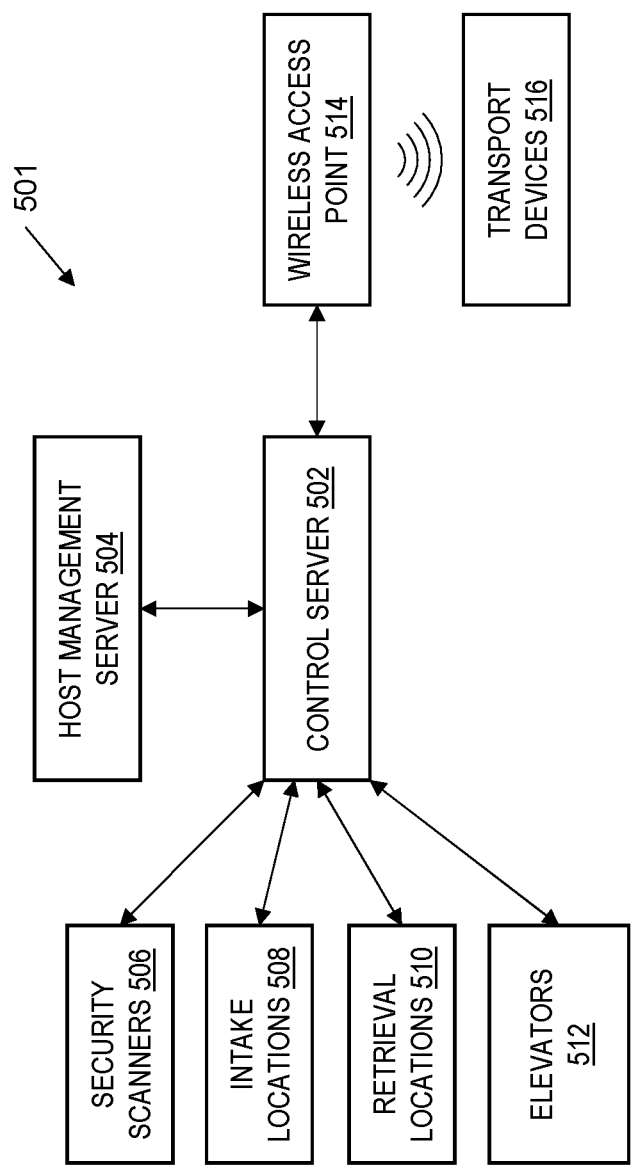
FIG. 3 depicts an exemplary block diagram of an exemplary embodiment of the improved security checkpoint system described herein.

FIG. 3 depicts an exemplary block diagram of an embodiment of the improved security checkpoint system as described herein. Referring to FIG. 3, in one embodiment, the improved security checkpoint system 501 may include control server 502, host management server 504, security scanners 506, intake locations 508, retrieval locations 510, elevators 512, wireless access point 514, and transport devices 516, which are depicted in a representative manner as blocks representing a generic descriptor of the technology. Control server 502 is configured for communicating with one or more components of the improved security checkpoint system 501 as described herein, and as shown, for example, in FIG. 1. In one embodiment, control server 502 includes memory, a processor, and/or one or more communication interfaces communicatively coupled to each other. A network may form part of improved security checkpoint system 501, wherein the network may take on any appropriate form, including a wireless network such as Wi-Fi, cellular, or other frequency bands for private use, or a hard-wired network such as LAN, WAN, internet, etc., and combinations thereof. In one embodiment, control server 502 and/or host management server 504 may communicate over the network with the cloud. In some embodiments, one or more components of control server 502 and host management server 504 may reside in the cloud. Similarly, several of the components such as, for example, security scanners 506, intake locations 508, retrieval locations 510, elevators 512, wireless access point 514, transport devices 516, control server 502, and host management server 504 may communicate over the network with the cloud. In some embodiments, one or more components of improved security checkpoint system 501 may reside in the cloud. For example, in one embodiment, control server 502 and/or host management server 504 may reside in the cloud. In at least one embodiment, host management server 504 may be in communication with one or more third-party servers, such as airline servers and/or security system servers.

As used herein, the term "cloud" refers to several servers connected to the internet that can be leased as part of a software or application service. Cloud-based services can include web hosting, data hosting and sharing, and software or application use. The term "cloud" also refers to cloud computing, where several servers are linked together to share the load. This means that instead of using one single powerful machine, complex processes can be distributed across multiple smaller computers. In various embodiments, control server 502 and/or host management server 504 can be or can otherwise include a server as the term "server" is understood in its broadest sense. The term "server" as used herein includes any computer that provides data to other computers. It may serve data to systems on a local area network (LAN) or a wide area network (WAN) over the Internet. In various embodiments, one or more of control server 502 and host management server 504 can be or can include a cloud server. The term "cloud server" as used herein includes any pooled, centralized server resource that is hosted and delivered over a network—typically the Internet—and accessed on demand by multiple users. A cloud server can be remotely located (e.g., reside in a remote cloud server configuration). A cloud server can be a virtual server (rather than a physical server) running in a cloud computing environment. A cloud server can be built, hosted, and delivered via a cloud computing platform via the internet, and can be accessed remotely. A cloud server can include all the software it requires to run and can function as an independent unit. A cloud server can perform all the same functions of a traditional physical server including delivering processing power, storage, and applications. One of the advantages of cloud storage is that there are many distributed resources acting as one—often called federated storage clouds. This makes the cloud very tolerant of faults, due to the distribution of data. Use of the cloud can reduce the creation of different versions of files, due to shared access to documents, files, and data.

Each of the components shown in FIGS. 1-3, 5 and 6 may be in communication with one or more other components through a wired and/or a wireless network. For example, the cloud, the control server 502, and/or the host management server 504 may further communicate with security scanners 506, intake locations 508, retrieval locations 510, elevators 512, wireless access point 514, and transport devices 516 over a network.

In one embodiment, control server 502 includes a controller. Control server 502 is configured to determine a security scanner 506 for a particular personal item identified at an intake location 508 as well as a retrieval location 510 for the particular personal item once the personal item has been scanned at the security scanner 506. Control server 502 is further configured to direct the transport device 516 to transport the personal item to the appropriate locations. In at least one embodiment, control server 502 includes a processor that is configured for directing one of the plurality of computer-controlled vehicles such as transport devices 516 (transport devices 516 are analogous to the computer-controlled vehicle 112 shown in, for e.g., in FIG. 1) to a personal item intake location 508 (also 106 in FIG. 1) to receive a personal item 107 from an individual. The processor of control server 502 is further configured for associating the personal item received at the personal item intake location with the computer-controlled vehicle that received the personal item from the individual. The processor of control server 502 is further configured for directing the computer-controlled vehicle that received the personal item to a selected one of the security scanners for scanning of the personal item. The processor of control server 502 is further configured for directing one of the plurality of computer-controlled vehicles to transport the personal item from the selected security scanner to a personal item retrieval location after the personal item has been scanned by the selected security scanner. Accordingly, in various embodiments, the computer-controlled vehicle that received the personal item from the individual performs one of: deposit the personal item at the selected security scanner, and transport the personal item through the selected security scanner.

In various embodiments, control server 502 may coordinate delivery of a plurality of personal items, wherein control server 502 is further configured for coordinating the delivery of the plurality of personal items by one or more of: a human process, a mechanical process, and a robotic process. The security scanners 506, intake locations 508, retrieval locations 510, elevators 512, and transport devices 516 work together to transport a plurality of personal items from the intake locations 508, to the security scanners 506, and then to retrieval locations 510, as determined by control server 502 and as directed by control server 502. This may include, as discussed above, using elevators to transport the transport devices carrying personal items to different levels as appropriate.

Figure 4:
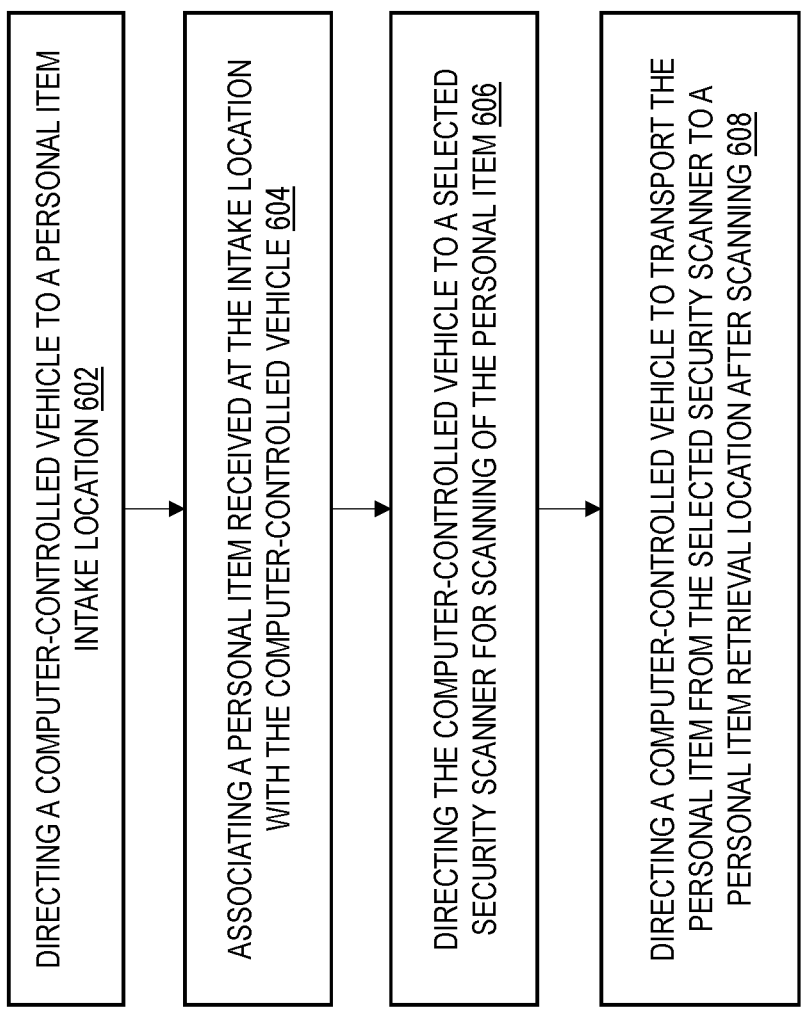
FIG. 4 depicts a flowchart of an exemplary process for the improved security checkpoint system.

FIG. 4 depicts a flowchart of an exemplary process for the improved security checkpoint system. The exemplary process shown in FIG. 4 may be implemented, for example, by control server 502 and/or host management server 504, either alone or working in combination. Referring to FIG. 4, at step 602, a computer-controlled vehicle is directed to a personal item intake location to receive a personal item from an individual. The computer-controlled vehicle may be selected from a plurality of computer-controlled vehicles. The computer-controlled vehicle may be selected based on availability (i.e., the computer-controlled vehicle is not currently carrying out any other tasks) and/or proximity to the intake location. At step 604, the personal item received at the intake location is associated with the computer-controlled vehicle that received the personal item. This advantageously allows the system to track the progress or travel of that personal item through the checkpoint. At step 606, the computer-controlled vehicle is directed to a selected security scanner for scanning of the personal item. The security scanner may be selected based on availability, length of wait, an operating parameter of the scanner, number of other items waiting to be scanned, etc. As described above, the security scanner may be selected in a manner that implements a load-balancing or evening technique or algorithm that provides for selection of the particular scanner to optimize the use of all available scanners to maximize throughput and efficiency of the system as a whole. At step 608, a computer-controlled vehicle is directed to transport the personal item from the selected security scanner to a personal item retrieval location after the scanning has been performed. If the scan shows no threat, then the computer-controlled vehicle is directed to a retrieval location that will allow the individual to retrieve their personal item. If the scan shows a need for further scanning, then the computer-controlled vehicle is directed to a retrieval location where further screening will be performed. In at least one embodiment, the paths used by the computer-controlled vehicles to transport the personal items between the intake locations, the scanners, and the retrieval locations may be determined according to the layout of the grids.

Figure 5:
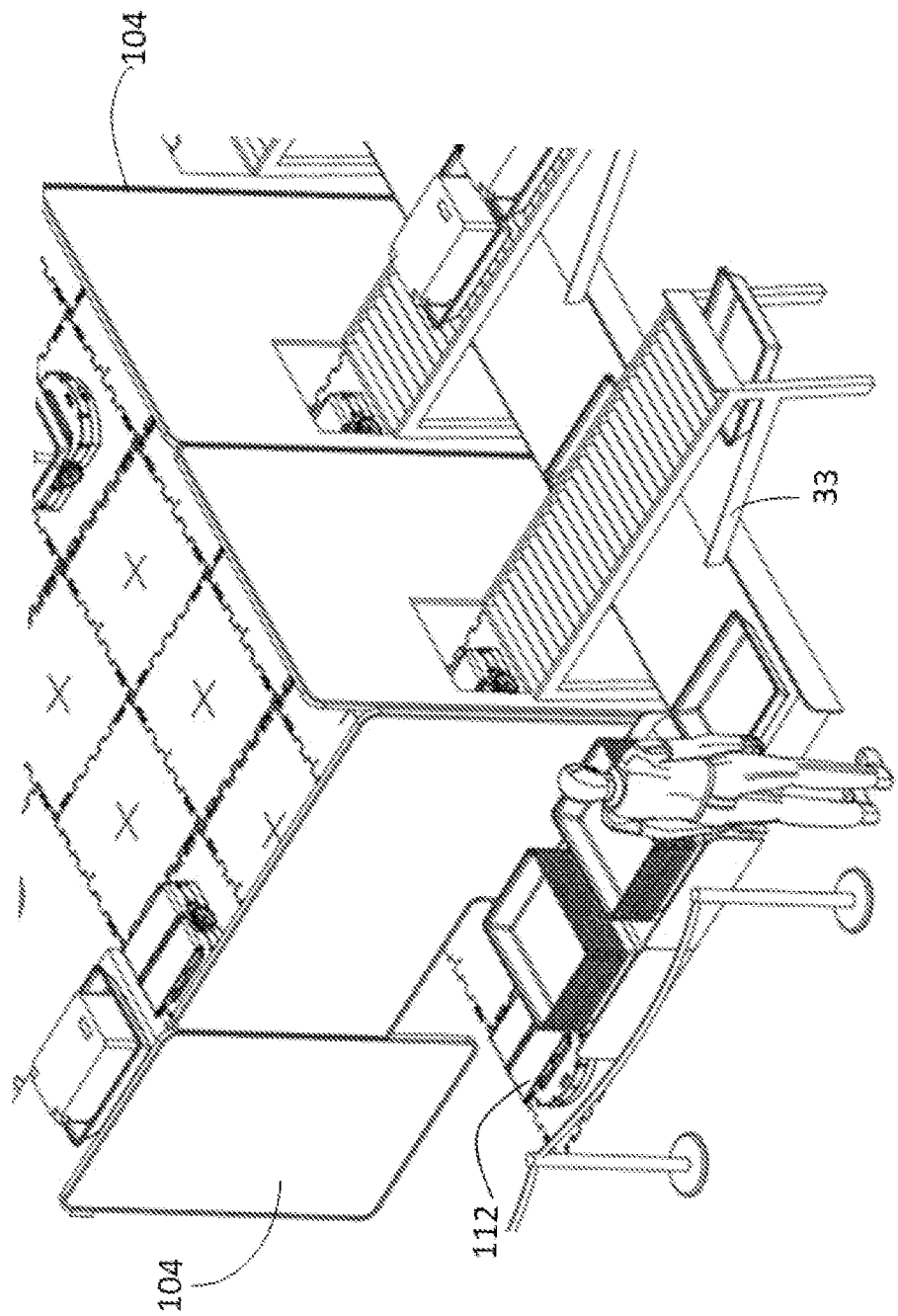
FIG. 5 depicts a perspective view of a portion of an exemplary embodiment for the improved security checkpoint system.

FIG. 5 illustrates one embodiment of the checkpoint security system. In at least one embodiment, the checkpoint security system may include slide or ramp (such as, for e.g., ramp 33 shown in FIG. 5) provided for an empty tote to slide down to a tote collection area. In an alternate embodiment, the security checkpoint system is configured such that the empty tote slides directly onto a computer-controlled vehicle such as computer-controlled vehicle 112. In the embodiment illustrated in FIG. 5, the enclosure 104 may include transparent portions, translucent portions, or combinations thereof. In at least one embodiment, at least a portion of the enclosure 104 may be opaque, for example, to provide privacy to the person being screened. In some embodiments, the enclosure 104 may accordingly include transparent portions, translucent portions, opaque portions, and combinations thereof.

Figure 6:
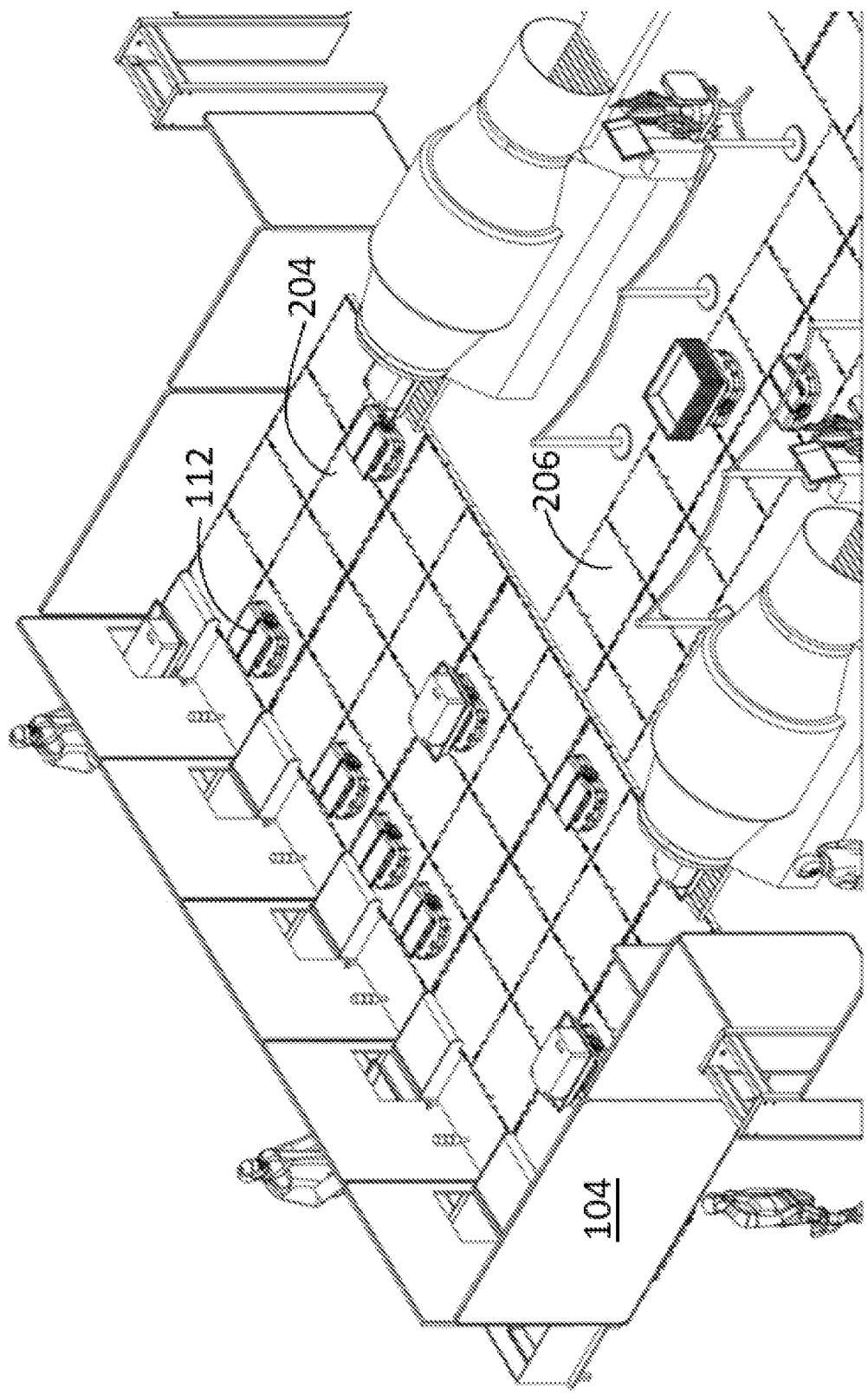
FIG. 6 depicts a perspective view of a portion of an exemplary embodiment for the improved security checkpoint system.

FIG. 6 illustrates one embodiment of the checkpoint security system. In at least one embodiment, the checkpoint security system may include at least two level (such as, for e.g., topmost level 204 and bottommost level 206 as shown in FIG. 6) provided for improved efficiency of the checkpoint security system. For example, in one embodiment, the baggage scanners may be disposed on topmost level 204 whereas the bottommost level 206 may be used for unladen computer-controlled vehicles to travel to either an assigned divestment location or an assigned baggage scanner in order to pick up the next baggage for transport, thus increasing the efficiency of the computer-controlled vehicles by reducing the traffic.

In some embodiments, the system is further configured to consolidate a plurality of baggage associated with a group of travelers being transported by a first vehicle from a first location to a first airport in a manner that minimizes or eliminates the need for each traveler to carry the traveler's respective baggage from the vehicle to the divestment location 106 of the checkpoint security system. In various embodiments, the first location can be one of locations, such as, for e.g., casinos, cruise ships, resorts, vacation spots, time-share locations, recreation locations, event locations, and similar other locations. Such locations often involve a group of travelers traveling together (e.g., in a same vehicle) from the same starting location to a nearby airport. The system may accordingly operate to allow for all (or most) carry-on luggage belonging to the group of travelers being transported from the first location to the checkpoint security system of the first airport to be automatically loaded onto the divestment location 106 at the same time the owner of the baggage in undergoing his/her security screening; this advantageously eliminates the need for each traveler to physically carry the traveler's respective baggage from the vehicle to the divestment location 106 before the traveler goes through the security screening process.

In various embodiments, the further screening at the secondary screening location may be carried out manually or in an automated manner, for e.g., by a screening appliance that utilizes machine learning and artificial intelligence technics and algorithms, with the algorithms configured for continuously learning and improving the automated secondary screening process.

In some embodiments, the travelling of a robot through a scanning machine (with or without a baggage loaded thereon) may be avoided in order to prevent any deteriorating effects of the (repeated) impact of scanning beams (transmitted within the scanning chamber of the scanning machine) on the robot itself; by contrast, in other embodiments, the baggage scanners are configured such that the robot can drive directly through the scanner.

In some embodiments, the maximum dimension or weight of the baggage that can be carried by the robot may set such that they conform with the maximum limits set by competent authorities such as, for e.g., airport authorities, airline authorities, national authorities, and similar other standard setting authorities.

In one embodiment, a checkpoint security system is disclosed. The checkpoint security system includes a baggage scanning system having multiple baggage intake locations, a baggage scanner, a baggage transport area, multiple baggage retrieval locations, a plurality of computer-controlled vehicles for transporting baggage through the baggage transport area between the baggage intake locations, the baggage scanners, and the baggage retrieval locations. The checkpoint security system further includes a processor. The processor is configured for directing one of the plurality of computer-controlled vehicles to a first baggage intake location to receive a first piece of baggage. The processor is further configured for associating the first piece of baggage received at the first baggage intake location with the computer-controlled vehicle that received the first piece of baggage. The processor is further configured for directing the computer-controlled vehicle that received the first piece of baggage to a selected one of the multiple baggage scanners to deposit the first piece of baggage at the selected baggage scanner. The processor is further configured for directing one of the plurality of computer-controlled vehicles to the selected baggage scanner to retrieve the first piece of baggage after the first piece of baggage has been scanned by the selected baggage scanner. The processor is also configured for directing the computer-controlled vehicle that retrieved the first piece of baggage from the selected baggage scanner to a first baggage retrieval location. In some embodiments, the personal item retrieval location requires the individual to be identified as being a correct person prior to permitting retrieval of the personal item by the individual. In some embodiments, the process is further configured to direct the personal item retrieval location to require the individual to be identified as being a correct person prior to permitting retrieval of the personal item by the individual.

In various embodiments of the checkpoint security system, the baggage intake locations may include a travel information scanner, a screen, and a speaker. In at least one embodiment, the information scanner (e.g., intake scanner) reads information identifying the traveler or individual. The screen and speaker provide instructions to the traveler. The instructions provided to the traveler may be tailored to the traveler based on the identification of the traveler at the baggage intake locations. Accordingly, in at least one embodiment, the screen and speaker operate to provide instructions to the individual. In an embodiment of the checkpoint security system, the processor may be further configured for removing the association between the traveler's ticket information and the computer-controlled vehicle and generating a new association of the traveler's ticket information with the assigned baggage scanner.

In an embodiment of the checkpoint security system, the computer-controlled vehicle that received the first piece of baggage from the first baggage intake location and the computer-controlled vehicle that retrieved the first piece of baggage from the selected baggage scanner is the same vehicle. In one embodiment of the checkpoint security system, the computer-controlled vehicle that received the personal item from the personal item intake location and the computer-controlled vehicle that retrieved the personal item from the selected security scanner are different vehicles. In an embodiment of the checkpoint security system, the computer-controlled vehicle that received the personal item from the individual transports the personal item through the selected security scanner.

In an embodiment of the checkpoint security system, the selected security scanner is selected by the processor, or by the checkpoint security system, based on availability across the multiple security scanners. In an embodiment, the processor is further configured for associating the personal item with the selected security scanner. In an embodiment, the processor is further configured for directing multiple of the computer-controlled vehicles to transport personal items from the personal item intake locations through the transport area in parallel to one another. In an embodiment, the checkpoint security system further comprises an individual screening location having a personal scanning system. In an embodiment, the processor is further configured for directing the computer-controlled vehicles along paths that avoid collisions with other computer-controlled vehicles. In one embodiment, the path determined for each computer-controlled vehicle may be based on an estimated size of the piece of baggage being transported by the computer-controlled vehicle. In an embodiment, the selected baggage scanner may be selected based on availability across the multiple baggage scanners. In an embodiment, the processor is configured for associating the personal item with the individual. In an embodiment, each personal item intake location includes a tote for receiving personal items. In an embodiment, the tote includes an identifying tag for tracking the personal item as it progresses through the checkpoint security system. In an embodiment, the identifying tag is an RFID tag. In an embodiment, the intake scanner reads information identifying the individual. In an embodiment, the security checkpoint system further includes a parking area where computer-controlled vehicles wait while not in use. In an embodiment, the security checkpoint system further includes charging locations provided where the computer-controlled vehicle can recharge.

In various embodiments, the processor may be further configured for associating the first baggage retrieval location with the traveler. The first baggage retrieval location may require the traveler to be identified and the association checked to confirm the traveler is the correct person to retrieve the baggage. The first baggage retrieval location may be a secondary screening location for further screening. In an embodiment, the checkpoint security system may further include a traveler screening location having a traveler scanning system.

In various embodiments of the checkpoint security system, the baggage transport area includes a platform divided into a plurality of nodes. The processor may be further configured for maintaining a list of nodes that each computer-controlled vehicle occupies at a moment in time. The number of nodes that each computer-controlled vehicle occupies is based on an estimated size of the piece of baggage being transported by the computer-controlled vehicle.

In various embodiments of the checkpoint security system, the baggage transport area may include multiple platforms arranged in a vertical configuration, with each platform including at least one of the multiple baggage scanners. The plurality of computer-controlled vehicles may be configured to travel across the multiple platforms arranged in the vertical configuration, and the computer-controlled vehicles move between the multiple platforms using a ramp or an elevator. In some embodiments, the computer-controlled vehicles operate in a baggage transport area that includes multiple platforms arranged in a vertical configuration, with each platform including at least one security scanner. In some embodiments, each personal item intake location includes a tote for receiving personal items. In some embodiments, the tote includes an identifying tag for tracking the personal item as it progresses through the checkpoint security system.

In various embodiments of the checkpoint security system, each baggage intake location may include a tote for receiving baggage. The tote may include an identifying tag for tracking the baggage as it progresses through the checkpoint security system. The identifying tag may be an RFID tag.

In various embodiments of the checkpoint security system, each baggage scanner or each security scanner may include multiple output paths (for e.g., including a right-angle transfer conveyor or elevator), with at least one output path being for baggage (or personal item(s)) that has been marked clear and at least one output path being for baggage that has been marked for secondary screening. In one embodiment, the output path for baggage that has been marked for secondary screening may be elevated above the output path for baggage that has been marked clear. In some embodiments, the output path for baggage that have been marked for secondary screening is depressed below the output path for personal items that have been marked clear. In some embodiments, the output path for baggage may just be a separate platform at the same level. In some embodiments wherein there are no multiple output paths from the scanner (i.e., there is only one output path from the scanner, the system may be configured for the robot to transport the baggage marked for secondary screening along the sole output path to the location of secondary screening.

A method of screening personal items at a checkpoint security system is provided herein. In various embodiments, the method comprises: directing one of a plurality of computer-controlled vehicles to a personal item intake location to receive a personal item from an individual; associating the personal item received at the personal item intake location with the computer-controlled vehicle that received the personal item from the individual; directing the computer-controlled vehicle that received the personal item to a selected one of the security scanners for scanning of the personal item; and directing one of the plurality of computer-controlled vehicles to transport the personal item from the selected security scanner to a personal item retrieval location after the personal item has been scanned by the selected security scanner.

In an embodiment, the method further comprising associating the personal item with the selected security scanner. In an embodiment, the method further comprises associating the personal item with the personal item retrieval location. In an embodiment, the method further comprises associating the personal item with the individual. In an embodiment, the method further comprises directing the computer-controlled vehicles along paths that avoid collisions with other computer-controlled vehicles. In an embodiment, the method further comprises maintaining a list of nodes that each computer-controlled vehicle occupies at a moment in time, wherein the nodes are part of a transport area that is divided into a plurality of nodes for navigation. In an embodiment, the number of nodes that each computer-controlled vehicle occupies is based on an estimated size of the personal item being transported by the computer-controlled vehicle. In an embodiment, the method further comprises directing a computer-controlled vehicle to transport an empty tote from the personal item retrieval location to the personal item intake location. In an embodiment, the method further comprises directing the computer-controlled vehicles to travel across the multiple platforms arranged in the vertical configuration, wherein the computer-controlled vehicles move between the multiple platforms using a ramp or an elevator.

A person of ordinary skill in the art would understand that the embodiments described in this application are examples, and that the scope of this application is not limited by these examples or embodiments. For instance, while the preferred embodiment relates to security checkpoints for air travelers, the apparatus and method described herein would apply equally well to any security checkpoint requiring screening of both individuals and baggage before allowing entry. For instance, the disclosed apparatus and method would also be applicable at security checkpoints for other areas of travel like ships (cruise liners, military ships, etc.), automotive travel (busses, etc.), blimps, dirigibles, etc. Similarly, the disclosure here is also relevant to security checkpoints for any building, park, military base, research institute, convention venue, large hotel that handles many people checking in at approximately the same time, sporting arena, theme park, country border, federal building, museum, or for any other checkpoint through which individuals may wish to carry personal baggage.

What is claimed is:

1. A checkpoint security system, comprising:
a system having one or more carry-on baggage intake locations, one or more security scanners, a transport area, one or more carry-on baggage retrieval locations, and a plurality of computer-controlled vehicles for transporting carry-on baggage through the transport area between the carry-on baggage intake locations, the security scanners, and the carry-on baggage retrieval locations; and
a control system having a processor, the processor configured for:
directing one of the plurality of computer-controlled vehicles to a carry-on baggage intake location to receive a carry-on baggage from an individual;
associating the carry-on baggage received at the carry-on baggage intake location with the computer-controlled vehicle that received the carry-on baggage from the individual, wherein the carry-on baggage is carried on an exposed surface of the computer-controlled vehicle to provide unrestricted access to the carry-on baggage while the computer-controlled vehicle transports the carry-on baggage;
directing the computer-controlled vehicle that received the carry-on baggage to a selected one of the security scanners for scanning of the carry-on baggage; and
directing one of the plurality of computer-controlled vehicles to transport the carry-on baggage from the selected security scanner to a carry-on baggage retrieval location after the carry-on baggage has been scanned by the selected security scanner,
wherein the processor is configured to operate the computer-controlled vehicles only within an area spanning between the carry-on baggage intake location and the carry-on baggage retrieval location.

2. The checkpoint security system of claim 1, wherein the computer-controlled vehicle that received the carry-on baggage from the individual performs one of: deposit the carry-on baggage at the selected security scanner or transport the carry-on baggage through the selected security scanner.

3. The checkpoint security system of claim 1, wherein the carry-on baggage intake locations comprise one or more of: an intake scanner, a screen, and a speaker.

4. The checkpoint security system of claim 3, wherein the screen and speaker provide instructions to the individual.

5. The checkpoint security system of claim 1, wherein the processor is further configured for associating the carry-on baggage with the selected security scanner.

6. The checkpoint security system of claim 1, wherein the carry-on baggage is placed in a tote, wherein the tote is received at the computer-controlled vehicle, wherein the processor is further configured for associating the carry-on baggage with the tote.

7. The checkpoint security system of claim 1, wherein the selected security scanner is selected based on availability across the one or more security scanners.

8. The checkpoint security system of claim 1, wherein the processor is further configured for associating the carry-on baggage with the carry-on baggage retrieval location.

9. The checkpoint security system of claim 1, wherein the carry-on baggage retrieval location requires the individual to be identified as being a correct person prior to permitting retrieval of the carry-on baggage by the individual.

10. The checkpoint security system of claim 1, wherein the processor is further configured for directing the computer-controlled vehicles along paths that avoid collisions with other computer-controlled vehicles, wherein the path determined for each computer-controlled vehicle is based on an estimated size of the carry-on baggage being transported by the computer-controlled vehicle.

11. The checkpoint security system of claim 1, wherein the transport area includes a platform divided into a plurality of nodes, each node comprising a navigation fiducial marker, wherein the processor is further configured for maintaining a list of nodes that each computer-controlled vehicle occupies at a moment in time.

12. The checkpoint security system of claim 10, wherein a number of nodes that each computer-controlled vehicle occupies is based on an estimated size of the carry-on baggage being transported by the computer-controlled vehicle.

13. The checkpoint security system of claim 1, wherein the transport area comprises multiple platforms arranged in a vertical configuration, with each platform including at least one of the security scanners.

14. The checkpoint security system of claim 13, wherein the plurality of computer-controlled vehicles is configured to travel across the multiple platforms arranged in the vertical configuration, wherein the computer-controlled vehicles move between the multiple platforms using a ramp or an elevator.

15. The checkpoint security system of claim 1, wherein each carry-on baggage intake location includes a tote for receiving carry-on baggage, wherein the tote optionally includes an identifying tag for tracking the carry-on baggage as it progresses through the checkpoint security system.

16. The checkpoint security system of claim 1, wherein each security scanner includes multiple output paths.

17. The checkpoint security system of claim 16, wherein at least one output path is for carry-on baggage that have been marked clear and at least one output path is for carry-on baggage that have been marked for secondary screening.

18. The checkpoint security system of claim 17, wherein the output path for carry-on baggage that have been marked clear is elevated above the output path for carry-on baggage that have been marked for secondary screening.

19. The checkpoint security system of claim 16, wherein the processor is further configured for directing a computer-controlled vehicle to transport one or more empty totes from the carry-on baggage retrieval location to the carry-on baggage intake location.

20. A method of screening carry-on baggage at a checkpoint security system, the method comprising:

directing one of a plurality of computer-controlled vehicles to a carry-on baggage intake location to receive a carry-on baggage from an individual;

associating the carry-on baggage received at the carry-on baggage intake location with the computer-controlled vehicle that received the carry-on baggage from the individual, wherein the carry-on baggage is carried on an exposed surface of the computer-controlled vehicle to provide unrestricted access to the carry-on baggage while the computer-controlled vehicle transports the carry-on baggage;

directing the computer-controlled vehicle that received the carry-on baggage to a security scanner selected among a plurality of security scanners for scanning of the carry-on baggage; and directing one of the plurality of computer-controlled vehicles to transport the carry-on baggage from the selected security scanner to a carry-on baggage retrieval location after the carry-on baggage has been scanned by the selected security scanner, wherein the computer-controlled vehicles are operated only within an area spanning between the carry-on baggage intake location and the carry-on baggage retrieval location.

* * * * *